United States Patent [19]

Burlew et al.

[11] 4,078,787
[45] Mar. 14, 1978

[54] AUTOMATIC TRANSFER FROM COLLATE TO NONCOLLATE MODES OF RECIRCULATING FEEDER AND COPIER OPERATION

[75] Inventors: Leroy Ellery Burlew; David Charles Hogan; Michael Gerald Reid, all of Rochester, N.Y.

[73] Assignee: Eastman Kodak Company, Rochester, N.Y.

[21] Appl. No.: 671,867

[22] Filed: Mar. 30, 1976

[51] Int. Cl.² .................. B65H 1/06; B65H 3/00; B65H 29/00
[52] U.S. Cl. ........................ 271/3.1; 271/4; 355/14
[58] Field of Search .............. 271/3.1, 3, 4, 5, 6, 271/7; 355/14

[56] References Cited

U.S. PATENT DOCUMENTS

| Re. 27,976 | 4/1974 | Sahley | 271/4 X |
|---|---|---|---|
| 3,556,512 | 1/1971 | Fackler | 271/4 |
| 3,630,607 | 12/1971 | Korn et al. | 355/14 X |
| 3,937,454 | 2/1976 | Colwill | 271/3.1 |

*Primary Examiner*—Bruce H. Stoner, Jr.
*Attorney, Agent, or Firm*—R. L. Owens

[57] ABSTRACT

Recirculating feeders, operatively connected to a copier, can operate in collate or noncollate modes, i.e. produce collated or noncollated output copies. In the noncollate mode of operation, the recirculating feeder acts in a similar manner as a conventional document feeder. When an operator places only a single original document in the recirculating feeder and, mistakenly, the feeder and copier are in the collate mode of operation, the apparatus will automatically determine that there is only a single original document in the recirculating feeder and transfer the mode of operation from collate to noncollate.

3 Claims, 10 Drawing Figures

AUTOMATIC TRANSFER FROM COLLATE TO NONCOLLATE MODES OF RECIRCULATING FEEDER AND COPIER OPERATION

CROSS REFERENCE TO RELATED APPLICATIONS

Reference should be had to commonly assigned, copending United States Patent application Ser. No. 647,683, the disclosure of which is referred to herein, entitled: RECIRCULATING SHEET FEEDER, filed: Jan. 18, 1976, in the name of Mathew J. Russel.

BACKGROUND OF THE INVENTION

1. Field of the Invention

This invention relates to apparatus within a recirculating feeder which, when coupled to a copier, can operate in either collate or noncollate modes.

2. Description of the Prior Art

A recirculating feeder can selectively make either collate or noncollate copies of a number of documents. As is disclosed in U.S. Pat. No. Re. 27,976 and application Ser. No. 523,610, now abandoned, by using a recirculating feeder, several collate copies of a multi-page original can be produced by a copier. Such a recirculating feeder feeds individual sheets in succession from the bottom of a stack to the exposure platen and returns each sheet to the top of the stack while maintaining the original orientation. After each of the sheets have been fed once, they can either be fed again or be removed from the feeder. Therefore, if the feeder is in the collate mode of operation, and since the copy pages are delivered from the copier in the same order as the original pages, collation of the copy pages by a sorter accessory is unnecessary.

There is a problem with this type of apparatus however. If an operator has inadvertently depressed the collate button rather than the noncollate button when, for example, there is only a single document to be copied ten times, this document will be recirculated ten times resulting in unnecessary document handling. If the operator had depressed the noncollate button, the original would have been circulated only once.

SUMMARY OF THE INVENTION

In accordance with a preferred embodiment, apparatus is disclosed for automatically detecting if only a single original document is in the recirculating feeder. In such a case, if the feeder is in the collate mode of operation, logic and control apparatus will automatically transfer the mode of operation from collate to noncollate.

In accordance with one embodiment of the invention, after the first document is fed, but prior to its reaching the exposure platen, if a switch, operatively associated with the feeder document tray, assumes a state indicating that there are no documents in the tray, logic and control apparatus will automatically transfer the feeder mode of operation from collate to noncollate.

BRIEF DESCRIPTION OF THE DRAWINGS

For a more complete understanding of the instant invention, as well as its advantages and features, the invention will be described in conjunction with the accompanying drawings, in which.

DESCRIPTION OF THE PREFERRED EMBODIMENT

Before proceeding with a detailed description of the preferred embodiment, first consider an electrophotographic copier, its jam detecting apparatus, and a logic and control unit which may be used in accordance with this invention. Thereafter, the feeder and its jam detecting apparatus will be explained. Finally, the document rearranging apparatus will be set forth.

Although the preferred embodiment is particularly well suited for use in a feeder coupled to an electrophotographic copier, the automatic rearrangement apparatus could be used with equal facility and advantage in any number of other copying, duplicating, or reproducing machines. All that is required is that such a machine have a platen or equivalent support onto which successive documents can be fed from a recirculating feeder.

In this disclosure, the feeder is said to be able to operate in a collate or noncollate mode. Of course, it will be understood that the feeder must be coupled to a copier for copies to be made. Thus, it is the feeder and the copier which actually function in these modes of operation. Moreover, the terms "documents" and/or "originals" refer to the sheets which are in the feeder and are to be copied. The term "copy sheet" refers to the output of the copier.

Electrophotographic Copier and Logic and Control Unit

Figure 1:
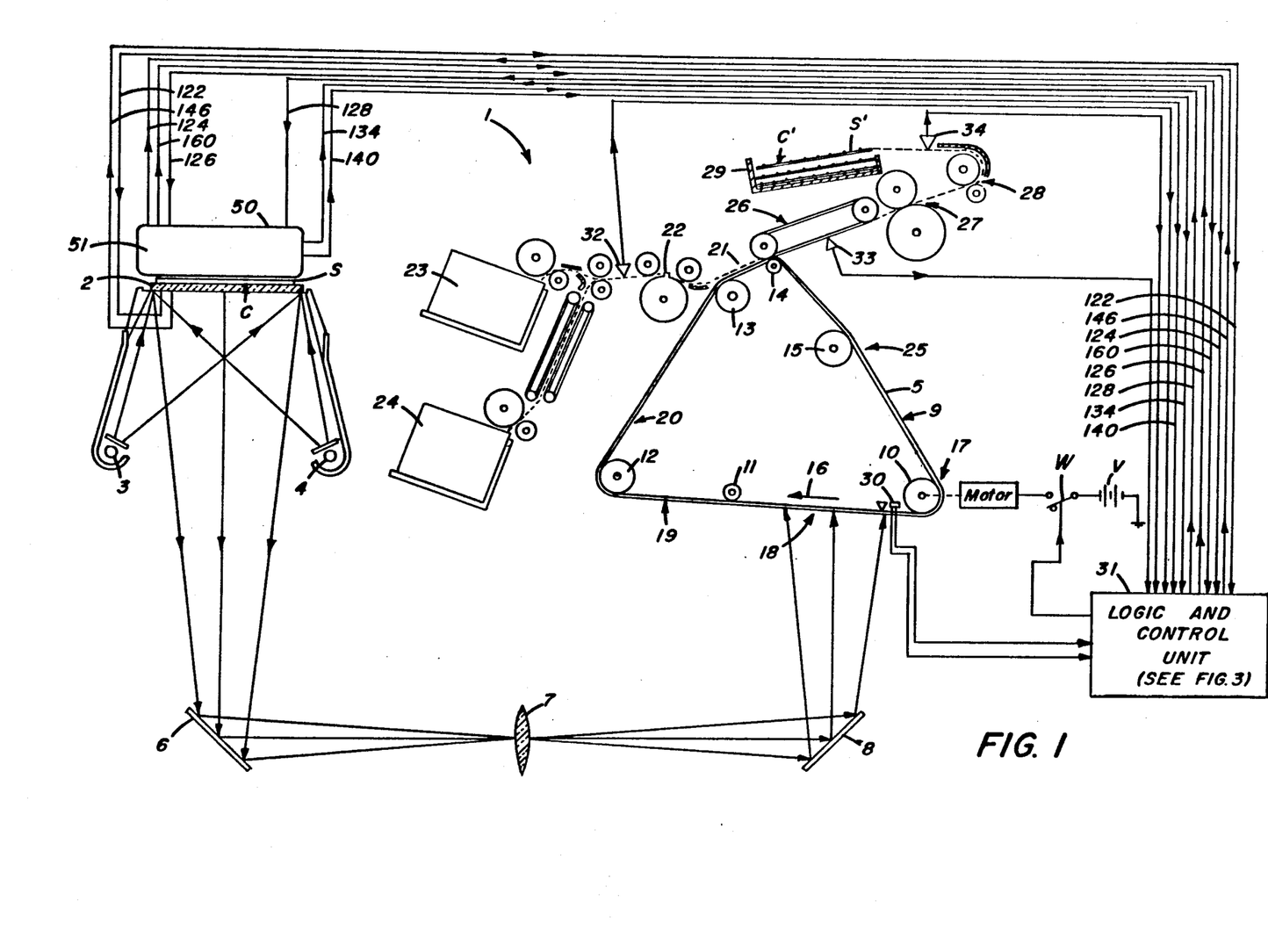
FIG. 1 is a schematic front elevation view of the apparatus including a web-type electrophotographic copier and a recirculating feeder.

Referring now to the drawings and in particular to FIG. 1, there is schematically illustrated an electrophotographic copier, designated by the reference numeral 1. Only those features of the copier which are helpful for a full understanding of the preferred embodiment are described hereinafter. However, a more complete description of the copier may be found in commonly assigned U.S. Pat. No. 3,914,047, patented: Oct. 21, 1975, in the names of Hunt et al.

To copy a selected side C of an original document sheet S using the copier 1, the original sheet is placed with the selected side C facing an exposure platen 2 constructed of transparent glass. When energized, two xenon flash lamps 3 and 4 illuminate the selected side C of the original sheet S. By means of an object mirror 6, a lens 7, and an image mirror 8, a light image of the selected Side C is reflected back from the exposure platen 2 and projected as an inverse or mirror image onto a discrete section of a photoconductive web 5. The photoconductive web 5 has a photoconductive or image receiving surface 9 and a transparent support backing and is trained about six transport rollers 10, 11, 12, 13, 14, and 15 as an endless or continuous belt. Roller 10 is coupled to a drive motor M in a conventional manner which is connected to a source of potential V when a switch S is closed by a logic and control unit (LCU) 31. When the switch S is closed, the roller 10 is driven by the motor M and moves the web 5 in a clockwise direction indicated by arrow 16. This movement causes successive sections of the web 5 to sequentially pass a series of electrophotographic work stations. For the purpose of the instant disclosure, the several work stations along the web's path of movement may be described as follows:

a charging station 17 at which the photoconductive surface 9 of the web 5 is sensitized by receiving a uniform electrostatic charge;

an exposing station 18 at which the inverse image of the selected side C of the original sheet S is projected onto the photoconductive surface 9 of the web 5; the image dissipates the electrostatic charge at the exposed areas of the photoconductive surface and forms a latent electrostatic image thereon which corresponds inversely to the indicia on the selected side C of the original sheet S;

a developing station 19 at which developing powder, including toner particles having an electrostatic charge opposite to that of the latent electrostatic image, is brushed over the photoconductive surface 9 of the web 5 and causes the toner particles to adhere to the latent electrostatic image to visibly form a toner particle or developed image which is a mirror resemblance of the indica on the selected side C of the original sheet S;

a postdevelopment erase station 20 at which the web 5 is illuminated to reduce photoconductor fatigue, i.e. its inability to accept or hold an electrostatic charge;

a transfer station 21 at which the developed image is electrostatically transferred from the photoconductive surface 9 of the web 5 to a receiving side C' of a copy sheet S' (movement of the copy sheet is checked by a registration device 22 to assure its arrival at the transfer station, from either one of two supply bins 23 and 24, coincidentally with the arrival of the developed image at the transfer station); and a cleaning station 25 at which the photoconductive surface 9 of the web 5 is cleaned of any residual toner particles remaining thereon after the developed image has been transferred and is discharged of any residual electrostatic charge remaining thereon.

The developed image, as transferred onto the copy sheet S', has the same indicia configuration as that of the original sheet S. After receiving the developed image at the transfer station 21, the copy sheet S' is separated from the web 5 at the roller 14 and is carried by a vacuum transport 26 to a fusing station 27. The fusing station 27 serves to fix the developed image by fusing the toner particles to the receiving side C' of the copy sheet S'. Finally, the copy sheet S' is moved through a guide and feed roller arrangement 28 to a completed copy tray 29. As depicted in FIG. 1, the copy sheet S' is deposited in the copy tray 29 with the fixed image or receiving side C' facing upwardly on top of an earlier, similarly deposited copy sheet.

To coordinate operation of the various work stations 17, 18, 19, 21, and 25 with movement of the image areas on the web 5 past these stations, the web has a plurality of perforations, not shown, along one of its edges. At a fixed location along the path of web movement, there is provided suitable means 30 for sensing web perforations. This sensing generates input signals into a LCU 31 having a digital computer. The digital computer has a stored program responsive to the input signals for sequentially actuating and de-actuating the work stations as well as for controlling the operation of many other machine functions as disclosed in U.S. Pat. No. 3,914,047.

Copier Paper Jam Condition

All paper jam conditions cause an immediate shutdown (hard shutdown) of the copier 1. There are three jam detection switches: paper feed switch 32, vacuum transport switch 33, and exit switch 34. All of the switches are identical in construction and may be conventional microswitches which are closed by the presence of an adjacent sheet in the paper path (logic "1") or open if no adjacent sheet is present (logic "0").

In the copying mode, the flow of paper under nominal conditions from the supply bins 23 or 24 to the exits is predictable. The time between initiation of paper feed and arrival of paper at any of the three paper sensing switches 32, 33, or 34 can be expressed in terms of film perforation signals. The film perforation signal count is stored in the computer (to be described later) in the LCU 31; at designated perforation count intervals, the paper sensing switches are interrogated. If paper has not arrived at the sensing switch within the expected perforation count interval, a malfunction is indicated. Likewise, if paper has not cleared a switch within the expected perforation count interval, a malfunction is indicated. It is important to note that the paper jam detection system is not based on time measurement, but on perforations counted by the computer. The LCU 31 knows the positions of the copy sheets traveling through the machine in terms of perforation counts. This concept is more fully described in U.S. Pat. No. 3,914,047.

Attention is now directed specifically to the switch 34 located at the exit of the copier. At predetermined perforation counts, the computer samples the state of this switch 34 to verify that the copy paper has in fact cleared the exit. This verification will be accomplished as follows: at the appropriate time, the computer will check to see if there is a copy sheet at the switch (logic "1"). Prior to this time, the next sheet should have arrived. After the copy sheet has exited, the switch should be open (logic "0"). Logic "0" refers to trailing edge detection. If a trailing edge is not detected prior to receipt of a subsequent leading edge, a paper jam is indicated and the LCU 31 will open switch W for a "hard shutdown" of the copier 1. The computer also counts the number of sheets that have properly exited the copier and stores the cumulative total number which is used in the document realignment (to be described later).

Copier jam recovery is accomplished by opening machine access covers, alleviating the problem (i.e. removing the jammed sheets), and closing the covers.

Logic and Control Unit 31

Programming of minicomputers or microprocessors, such as an INTEL 8008 (which has been used in accordance with the invention), is a conventional skill well understood in the art. The following disclosure is written to enable a programmer having ordinary skill in the art to produce an appropriate program for the computer. The particular details of any such program would, of course, depend upon the architecture of the seleced computer.

Figure 3:
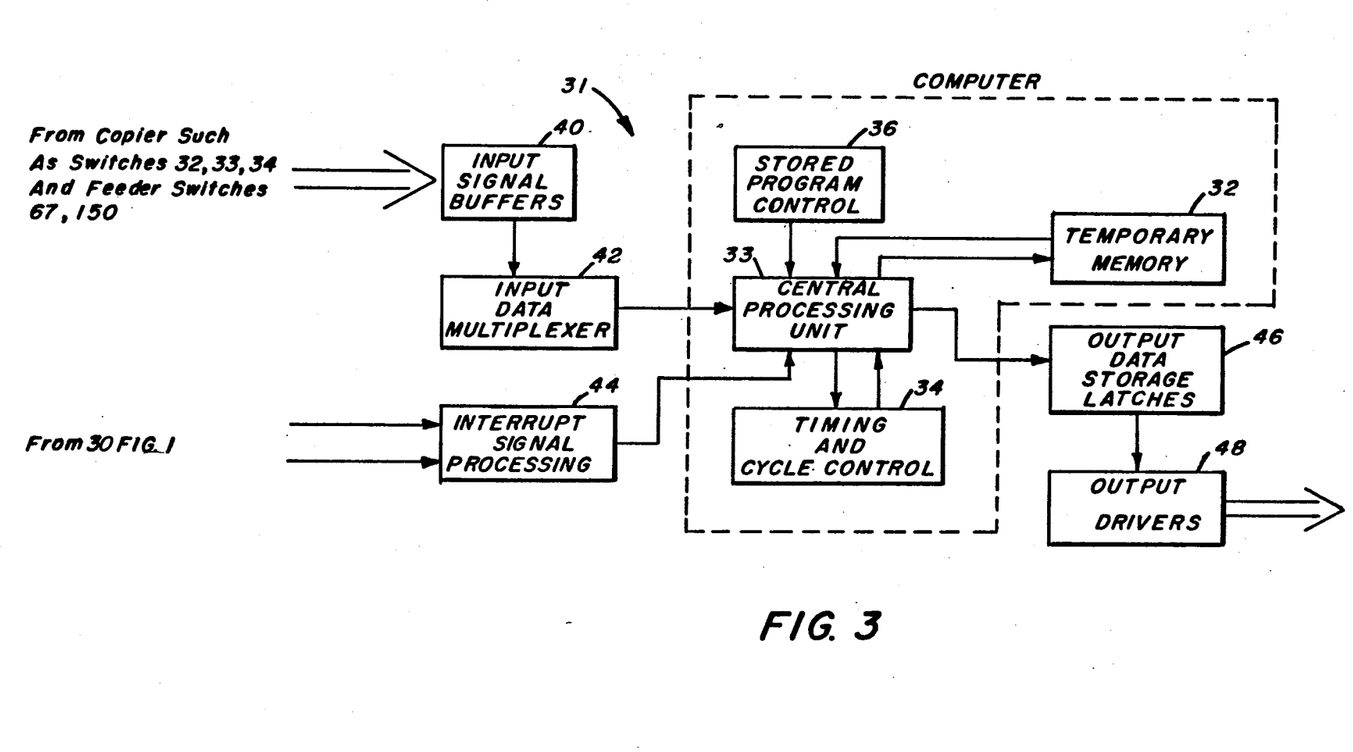
FIG. 3 is a block diagram of the logic and control unit shown in FIG. 1.

Turning now to FIG. 3, a block diagram of a typical logic and control unit (LCU) 31 is shown which interfaces with the copier 1 and the feeder 50. The LCU 31 consists of temporary data storage memory 32, central processing unit 33, timing and cycle control unit 34, and stored program control 36. Data input and output is performed sequentially under program control. Input data is applied through either input signal buffer 40 to a multiplexer 42 or to signal processor 44 from perforations detected on the web 5. The input signals to the signal buffer 40 consist of logic level digital signals which are derived from various switches, sensors, and analog-to-digital converters. The output data and control signals are applied to storage latches 46 which provide inputs to suitable output drivers 48 which are directly coupled to leads which, in turn, are connected to the work stations. More specifically, the output signals from the LCU 31 are logic level digital signals which are buffered and amplified to provide drive signals to various clutches, brakes, solenoids, power switches, and numeric displays in the various copier work stations and the feeder 50. The LCU 31 processing functions can be programmed by changing the instructions stored in the computer memory. This programming technique provides a flexible machine logic and timing arrangement and extends the LCU 31 capability to include the capacity for performing service diagnostics. For example, if an input signal is not delivered to the LCU 31 at the appropriate time, the LCU 31 will display an ERROR code on the control panel. The ERROR code indicates a machine failure and, during servicing, usually provides the specific nature of a machine failure. During a copy cycle, the LCU 31 executes the stored program which controls the processing of signal inputs to the LCU 31 and initiates turn ON, turn OFF, and timing of output control signals.

The time sequence of machine control signals (often referred to in the art as events) is critical to the copy cycle because the copier and feeder stations and associated mechanisms must be powered ON and OFF in the correct sequence to assure high quality copying and to prevent paper misfeeds, misregistration, and erratic operation. One way of controlling the time sequence of events and their relationship to each other is, as noted above, to sense perforations which correspond to the location of the image elements on the web 5 as these elements continue through the cycle of the copier's endless path. Thus, the detection of perforations by a sensor 30 is applied to the LCU 31 through an interrupt circuit 44 (see FIG. 3) and is used to synchronize the various control mechanisms with the location of the image elements. These perforations are spaced equidistant along the edge of the web member 16. For example, the web member 16 may be divided into six image areas by F perforations; and each image area may be subdivided into 51 sections by C perforations. These F and C perforations (not shown) are described in U.S. Pat. No. 3,914,047.

Returning now to the computer, the program may be embodied by a Read Only Memory (ROM) 36. The ROM contains the operational program in the form of instructions and fixed binary numbers corresponding to numeric constants. These programs are permanently stored in the ROM and cannot be altered by the computer operation.

Typically, the ROM 36 is programmed at the manufacturer's facility, and the instructions programmed provide the required control functions such as: sequential control, jam recovery, operator observable logic, machine timing, and automatic document rearrangement. For a specific example, the total ROM capacity may be approximately 2,000 words with each word being 8 bits in length.

The temporary storage memory 32 may be conveniently provided by a conventional Read/Write Memory. Read/Write Memory or Random Access Memory (RAM) differs from ROM in two distinct characteristics:

1. Stored data is destroyed by removal of power; and
2. The stored data is easily altered by writing new data into memory.

For specific example, the RAM capacity may be 256 words; each word being eight bits in length. Data, such as: copy requested count, copies processed count, and copies delivered count, at the exit as indicated by the switch 34, are stored in the RAM until successful completion of a copy cycle. The RAM is also used to store data being operated on by the computer and to store the results of computer calculations in document rearrangement (to be described later).

Recirculating Feeder

The preferred embodiment of a recirculating feeder is designated by the reference numeral 50 in FIG. 1. The recirculating feeder 50 is positioned directly on top of the exposure platen 2. For access to the exposure platen 2, the recirculating feeder 50 is raised at a front end 51; the entire feeder pivots about a rearwardly located connection, not shown, with the copier 1. With this feeder 50, a plurality of sheets can be repeatedly fed in succession from an originating stack to the exposure platen 2 of the electrophotographic copier 1. This is done by returning the sheets to the originating stack in the same order or sequence as they are fed from. The LCU 31 synchronizes the operation of the feeder 50 with the copier 1.

Figure 2:
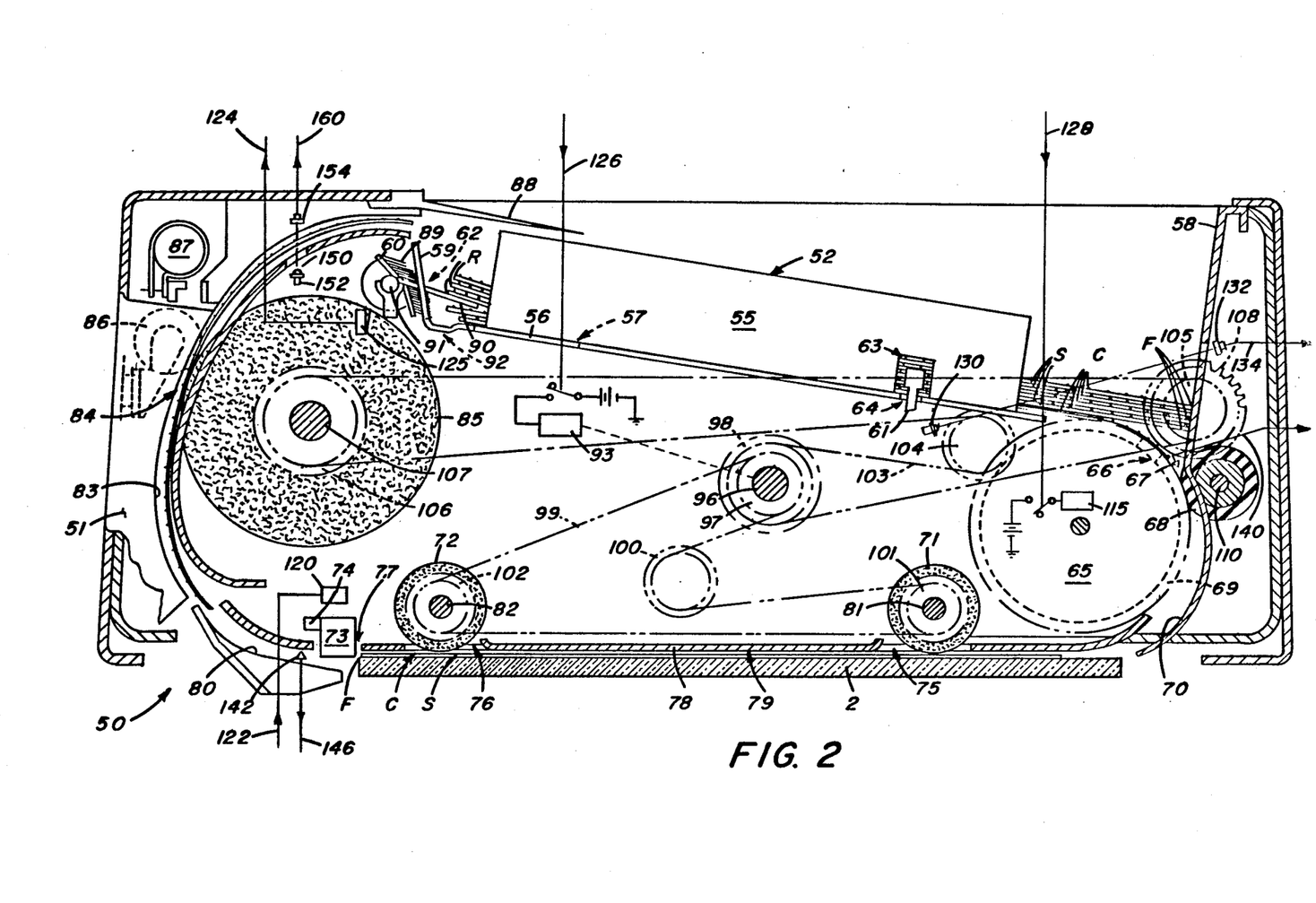
FIG. 2 is an enlarged front elevation view, partly in section, of the recirculating feeder of FIG. 1.

As illustrated in FIG. 2, the recirculating feeder 50 is loaded by placing an originating stack of document sheets S into a supply tray 52. The sheets S, stacked in the tray 52, are oriented with their respective sides C, selected for copying, facing upwardly. An air space is provided between ribs (not shown) in the bottom-most sheet in the stack and the floor plate to facilitate removal of the bottom-most sheet from the stack. The edge guides 55 are mounted in respective slots 57 in the floor plate 56 for movement toward and away from each other to accommodate different width sheet sets. The tray 52 is inclined downwardly to the right, causing the forward or leading edges F of the sheets S to rest against a forward wall plate 58. The rearward or trailing edges R of the sheets S are spaced from a rearward wall plate 59 of the tray 52. During the feeding cycle in which the sheets S are removed from the stack bottom and returned to the stack top, an end jogger 60 and a side jogger 61 separately move back and forth to align the sheets with each other in the stack. Openings 62 are provided in the rear wall plate 59 of the tray 52 and in one of the edge guides 55 for passage of the end and side joggers 60 and 61. The end joggers 60 are movably adjustable to accommodate different length sheet sets.

A rotatably supported vacuum cylinder 65 extends partially into the space between the floor plate 56 and the wall plate 58. The vacuum cylinder, which is hollow, is sealed except for a single elongate series of air intake ports 66 and an air out-take opening, not shown. Suitable conduit and gasket means, not shown, connect the air out-take opening with a vacuum source in the copier 1 for drawing air from the cylinder interior. Initially, the vacuum cylinder 65 is oriented with the air intake ports 66 in a starting position beneath the forward edge F of the bottom-most sheet S in the tray 52. Air rushing into the intake ports 66 causes this forward edge F to peel away from the stack bottom and adhere to the vacuum cylinder 65. Then, the vacuum cylinder 65 is rotated slightly in a clockwise direction to draw the bottom-most sheet S from the stack only enough to deliver its forward edge F into respective feeding nips defined by continuously rotating feed rollers 68 and backup rings 69. The remaining sheets S are prevented from separating from the stack by the engagement of their forward edges F with the wall plate 58. Backup rings 69 extend around the vacuum cylinder 65 and rotate with respect to the vacuum cylinder and about the same axis.

The backup rings 69 cooperate with the feed rollers 68 to effect complete removal of the bottom-most sheet from the stack and to feed the removed sheet along an arcuate guide 70 to the exposure platen 2. As soon as the vacuum cylinder 65 has delivered the forward edge F of the bottom-most sheet into the feeding nips, the cylinder 65 is reversed, rotating slightly in a counterclockwise direction, until the intake ports 66 are returned to their starting position. During this reverse movement of the vacuum cylinder 65, the intake ports 66 inch rearwardly along the bottom-most sheet as it is being drawn between the feed rollers 68 and the backup rings 69. After the intake ports 66 have returned to their starting position and the rearward edge of this sheet clears the ports, there is a renewed rush of air into the intake ports which peels the forward edge of the next bottom-most sheet from the stack and causes it to adhere to the vacuum cylinder 65. Then, the vacuum cylinder 65 is again rotated slightly in a clockwise direction to draw the next bottom-most sheet from the stack only enough to deliver its forward edge into the feeding nips. The feeding nips receive the forward edge of this sheet upon departure of the rearward edge of the previous sheet. Accordingly, by the sequence just described, each of the sheets S are removed one at a time from the stack bottom and fed to the exposure platen 2.

After exiting from the arcuate guide 70, each sheet S is deposited with its side C selected for copying facing downwardly on the platen 2. Two sets of continuously rotating feed rollers 71 and 72 move the sheet S, selected side C downwardly, along the platen 2 and into registration therewith for exposure. During such registration, the sheet S lies stationary on the exposure platen 2 with its forward edge F against two registration pads 73 (only one of which is shown) which are spaced apart from each other on a registration bar 74. The registration pads 73 and bar 74 are located along the feed path at the platen end farthest removed from the supply tray 52. Because the feed rollers 71 and 72 urge the sheet S against both of the registration pads 73, any skew in the sheet S is corrected before it is exposed. Feed rollers 71 and 72 and the registration pads 73 depend through respective openings 75, 76, and 77 in a backup plate 78. This plate 78 extends substantially parallel to the platen 2. A light reflective material, serving as a light shield during exposure, is coated on the side 79 of the plate 78, which side faces the platen 2. While the registration pads 73 block movement of the sheet S, feed rollers 71 and 72 continue to rotate, slipping on the backside of the sheet. This slipping occurs for a fraction of a second during the time the sheet is stationary (between registration of the sheet and its exposure). After exposure, a pulse carried by a lead 122 from the LCU 31 actuates a solenoid 120 to retract the registration bar 74, with the registration pads 73, from the feed path and out of the way of the sheet S. Then, the rotating rollers 71 and 72 immediately expel the sheet S from the exposure platen 2 and move the sheet onto an arcuate guide 80. As shown in FIG. 2, to again move the registration bar 74 with the registration pads 73 for sheet registration, the LCU 31 deactivates the solenoid 120.

In the upper left hand portion of FIG. 2 there is shown a separator member 90 which extends through the opening 62 in the rearward wall plate 59 into the originating stack in the supply tray 52. The bottom surface of separator member 90 initially engages the top sheet of a document stack. At the rearward edges R, the separator member 90 separates the documents S in the stack which have been exposed from those which remain to be exposed. The separator member 90 is fixed to a rotatable support shaft 91. As viewed in FIG. 2, as the documents S are fed in succession from the stack bottom to the exposure plate 2 and returned singly to the stack top, the separator member 90 rotates incrementally in a clockwise direction at the shaft 91. When the last sheet to be exposed is fed from the stack bottom, the separator member 90 drops through an opening 92 in the floor plate 56 of the supply tray 52. Where two or more feeding cycles are required or several collated copies of a multi-page document are desired, after the last sheet to be exposed a first time is returned to the stack top, the separator member 90 is moved by suitable drive means, not shown, onto the topmost sheet in the stack. When the separator member 90 drops through the opening 92 in the floor plate 56, a micro switch 125 is actuated. This switch actuation provides a pulse to the digital computer in the copier 1 on line 124, as shown in FIG. 1, and indicates to the computer that a single sheet set has been copied. The computer totalizes the number of copy sets which have been made. At the end of the copy job, the computer recognizes concurrence between the number of sensed switch actuations and the number of sheet set copies requested by an operator. Then, after the last sheet to be exposed is returned to the stack top, the recirculating feeder 50 is deactivated.

A drive shaft 96 and two side-by-side drive pulleys 97 and 98 are rotated by a drive motor 93 which has been energized by a source of potential in the lead 126 from the LCU 31. Rotation of the drive pulley 97 moves an endless drive belt 99 which rotates a belt tensioning pulley 100 and two roller pulleys 101 and 102. By rotating the roller pulleys 101 and 102, the roller shafts 81 and 82 are rotated with the feed rollers 71 and 72. Also, rotation of the drive pulley 98 moves an endless drive belt 103 which rotates a belt tensioning pulley 104 and two roller pulleys 105 and 106. By rotating the roller pulley 106, a roller shaft 107 is rotated with the feed rollers 85. Rotation of the roller pulley 105 rotates two engaging gear wheels, with only one of the wheels 108 being shown. By rotating the gear wheel 108, a roller shaft 110 is rotated with the feed rollers 68.

As is more fully disclosed in U.S. patent application Ser. No. 647,683, a drive mechanism is provided for intermittently oscillating the vacuum cylinder 65 to deliver the forward edges of the sheets, one at a time, from the originating stack to the feeding nips (of the shaft for the cylinder 65 is connected to an electric, one-revolution clutch 115. When energized by the LCU 31 through lead 128, the clutch causes an intermittent drive mechanism connected to the cylinder 65 to rotate back and forth once. This rotation of this intermittent drive mechanism causes a sheet to be fed to the exposure platen 2.

Feeder Operation, Logic and Jam Detection

The feeder 50 enables the copier 1 to make collated or noncollated sets of copies. In the feeder, a plurality of sensors along the document feed path provide inputs to the LCU 31. Next to the tensioning pulley 104 is a light emitting diode LED 130 which directs a beam of light towards a photocell 132. If no documents are present in the stack, the photocell 132 signals the LCU 31 over lead 134 that the document supply is empty. The LCU 31 will then shutdown the feeder by deenergizing the clutch 115. A microswitch 67 is disposed adjacent the feeding nips of the feeding rollers 68 and backup rings 69. When a document passes by this switch 67, the switch closes and a logic "1" is sent to the LCU 31 by a lead 140. When no document is at this position in the feed path, the lead 140 indicates a logic "0" to the LCU 31. Located immediately after the registration pads 73 is a microswitch 142 which provides similar signals to the LCU 31 over lead 146. The purpose of this microswitch 142 is to tell the LCU if a document has cleared the platen 2. (The use of the switch 142 is not critical and may be eliminated.) Finally, near the supply tray 52 there is provided a document sheet return switch 150 which includes an LED 152 and a photocell 154. The photocell 154 sends logic signals "1" and "0" to the LCU 31 over lead 160, indicating the presence or absence of a sheet, respectively, at this position. In order to determine if there has been a document jam in the feeder 50, the leads 140 and 160 are sampled by the LCU 31 at the appropriate times in accordance with the perforations on the copier web 5 to see if each fed document has cleared each of these positions. If a document has not cleared each position, a jam is indicated and the feeder is "hard shutdown". However, the copier is permitted to complete the copies in process. The logic "1" signals from the switch 150 are also stored and accumulated by the LCU 31 in a location of temporary memory 32 to indicate the total number of document orignals which have been exposed at the platen 2. This cumulative total is used in the automatic rearrangement apparatus, as will be described later in this specification.

The feeder 50 can operate in collate and noncollate modes. Both modes of operation are quite similar. The events relative to the position of a document along the feed path are as follows:

1. After documents are placed in the document tray, the photocell 132 signals the LCU 31 over lead 134 that documents are present. Now, an operator can select either the collate or noncollate mode by depressing the appropriate button on the feeder control panel, not shown.

2. After the copier start button is depressed, the LCU 31 energizes the motor 93, and clutch 115, as well as a vacuum blower motor, now shown, and causes the separator member 90 to be reset to the top of the document stack. After the vacuum has had time to reach its proper level, the LCU 31 issues the first document feed command. The bottom-most document in the document tray is fed past the Fed/Registered Sensor (at position 67) and is registered against the pad 73.

3. The original is exposed once in the collate mode and returned to the top of the stack. In the noncollate mode, the document is exposed a number of times until the copies processed count (the number of exposure flashes) equals the copies requested count. (Both of these counts are in temporary storage memory 32 of the computer.) After the appropriate number of copies are made, the pads 73 are lifted as the LCU 31 energizes solenoid 120; and the document is returned to the document tray past the platen clear switch 142 and return switch 150.

4. Now, the second feed command is given and the second original is fed to the platen 2. Continuity in the feeder operation is maintained by setting the first original on top of the stack before the trailing edge of the second original leaves the stack.

5. In the collate mode, the feeding process continues until the sets processed (i.e. the number of signals from the microswitch 125) coincides with the sets requested. In the noncollate mode, the feeding process continues until all documents in the document tray have been fed as indicated by a single signal from the switch 125.

6. When the feeding process is complete, the feeder is turned "OFF".

7. If a paper jam occurs in the feeder, the feeder drive motor 93 and blower motor are immediately turned "OFF". The copier is allowed to clear itself of copies before being turned "OFF". A visual signal appears on the operator panel to alert the operator to clear the jam.

Figure 4:
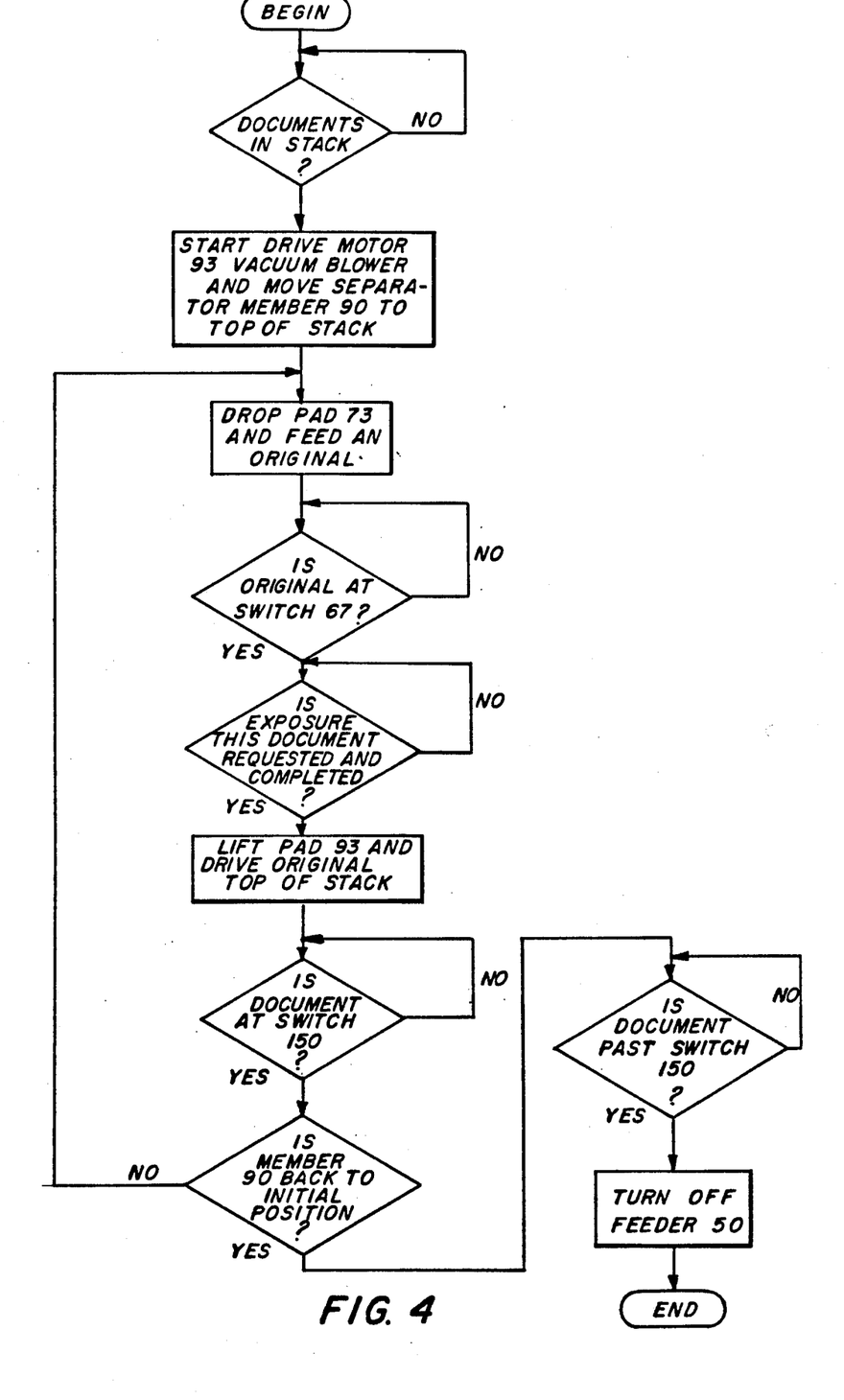
FIGS. 4 and 5 are flow charts of the noncollate and collate modes of operating the feeder of FIG. 1, respectively.

Turning now to FIG. 4, the flow chart for the operation of the feeder 50 is shown for a noncollate mode of operation. The first decision that LCU 31 makes is if there are documents in the tray 52 by sampling the lead 134 connected to the photocell 132 to determine if it is in a logic "1" or a logic "0" state. If there are no documents in the tray 52, the feeder cannot be started. However, if there are documents in the tray 52, the LCU 31 energizes the drive motor 93 and the vacuum blower and causes the separator member 90 to move to the top of the stack. Next, the LCU 31 de-energizes the solenoid 120 which drops the pads 73 and also energizes the clutch 115 which causes a document to be fed from the bottom of the stack along the feed path. At the appropriate time as determined by perforations in the web 5, the LCU 31 samples the lead 140 to determine if a document is at the switch 67. If a document is not at the switch 67 or is jammed at the switch 67, the machine will be shutdown. The detection of no documents at the switch 67 indicates a document misfeed which could have been caused by a failure in the vacuum supply or by a paper jam at the entrance to the feed path. As an alternate approach for the document misfeed situation, the LCU 31 could have been programmed to require two misfeeds before shutting down the feeder 50. Assuming the document has passed the switch 67 correctly and is now located at the exposure platen 2, the LCU 31 checks, and after each exposure continues to check, to see if the process count equals the copies requested count. If the LCU 31 determines that more copies are to be made, the exposures of such copies are made until the counts are equal. At such time, the solenoid 120 is energized and the document at the exposure platen 2 is driven toward the top of the stack. The computer will then check to see if this document has advanced to the switch 150. If the document does not clear the switch 150, a jam will be indicated. The next decision the LCU 31 makes is if the separator member 90 has been driven back to its initial position indicating the completion of a copy run. If the separator member 90 has not been driven back to its initial position, the LCU 31 will energize the drive motor 93 and the vacuum blower and cause the separator member 90 to move to the top of the stack. If the separator member 90 is in its initial position, the switch 150 will be sampled again to assure the computer that the last document has in fact cleared the switches 67 and 150. If the document has not cleared the switches 67 and 150, an appropriate indicator on the operator panel will be illuminated. In either case, the feeder will be stopped.

Figure 5:
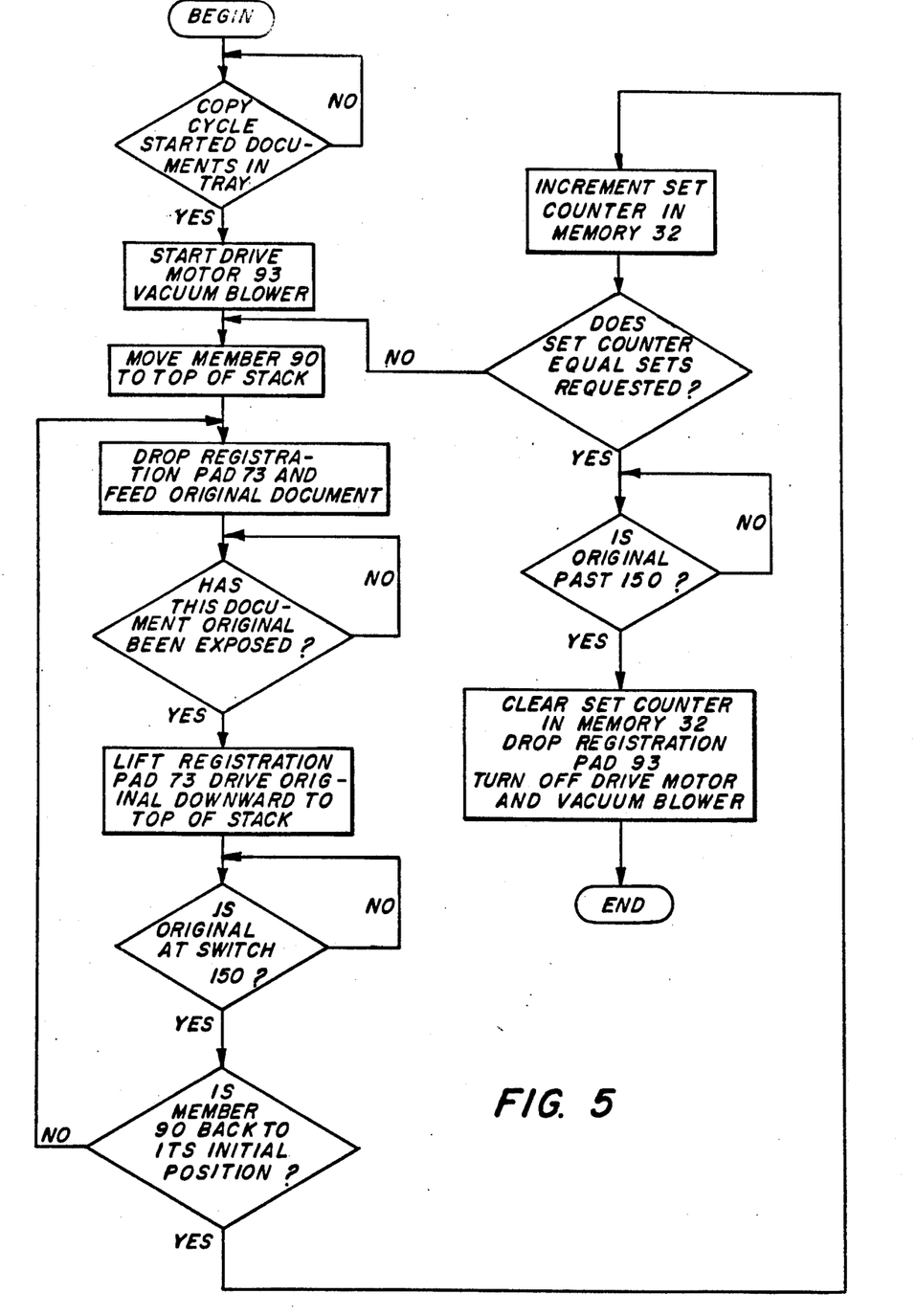

FIG. 5 shows the flow chart for the feeder operation in the collate mode of operation. Many of the functions of the collate mode of operation are identical to those of the noncollate mode of operation in FIG. 4 and, therefore, need not be described. As shown in FIG. 5, after the separator member 90 has returned to its initial position at the top of the stack, the lead 124 provides a signal to the LCU 31 which stores a count in a memory location of the temporary storage memory 32. In effect, this signal from the lead 124 to the LCU 31 causes the set count to be incremented by one. The computer then asks the question, is the set count equal to the number of sets requested? If the answer to that question is no, the flow chart branches back to the initial position in FIG. 5, and the process of making copies is repeated. If the answer to the question is yes, the switch 150 will be checked for a paper jam at its location. If no paper jam exists at switch 150, the LCU 31 will clear the set counter, drop the registration pads 73, and turn off the drive motor 93 and the vacuum blower; thus, stopping the feeder.

To summarize, the following steps compare the operation of the feeder when operating in noncollate and collate modes.

| NONCOLLATE | COLLATE |
| --- | --- |
| (1) Requested/processed displays on copier indicate copies per original requested/processed. | (1) Requested/processed displays on copier indicate sets requested/processed. |
| (2) Requested copies per original for each original in document stack. | (2) One copy per original for each original in document stack for all sets requested. |
| (3) Document is returned to stack after requested exposures/original is complete. | (3) Document is returned to stack after one exposure |
| (4) Set counter indicates noncollated sets complete. Feeder process complete. | (4) Set counter counts sets delivered. |

The following is a discussion of the logic flow for the feeder.

Document Rearrangement

Figure 6:
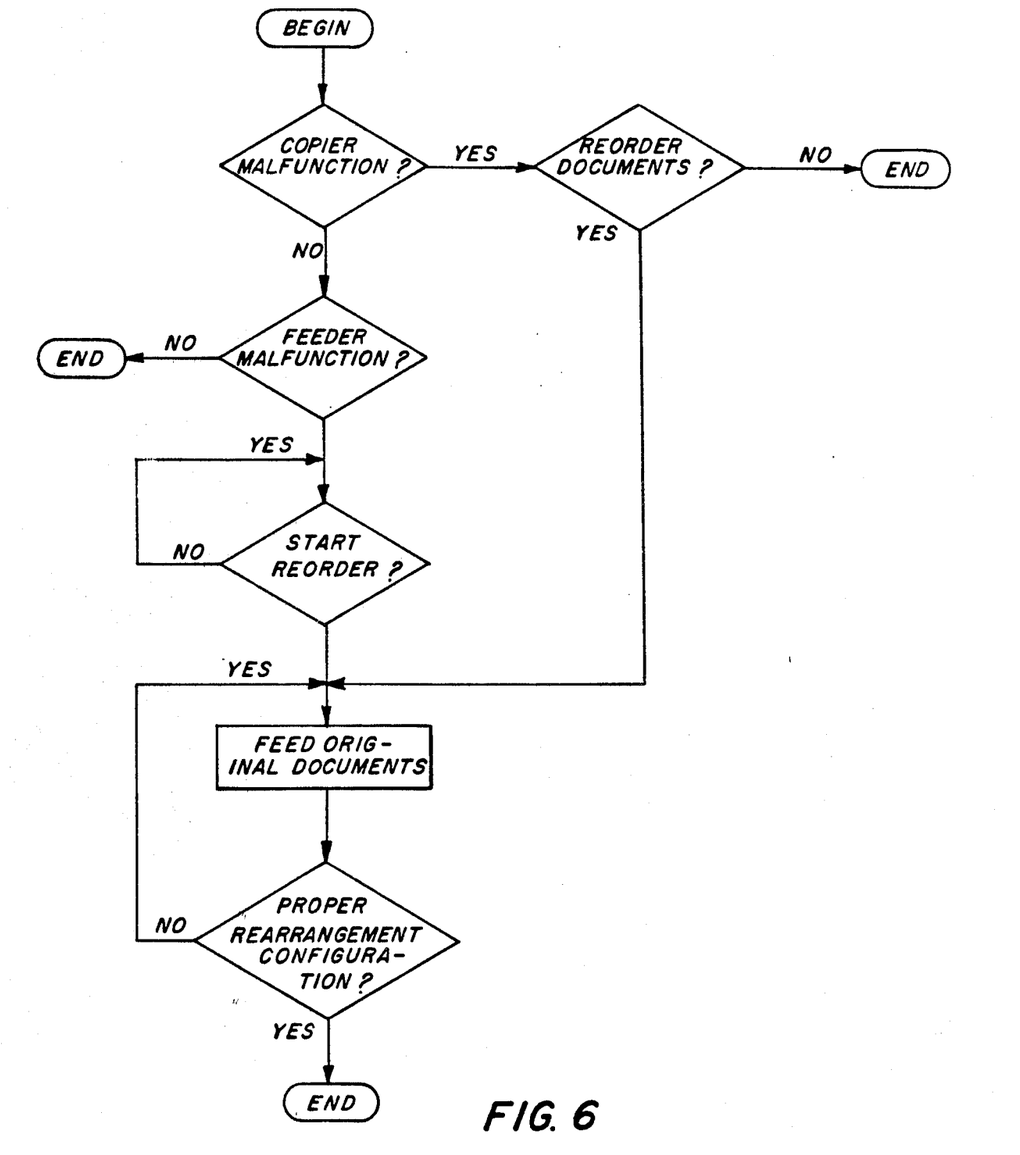
FIG. 6 is a simplified flow chart illustrating the general logical sequence for rearranging documents in the recirculating feeder after a jam has occurred in either the feeder or copier.

Turning now to FIG. 6, there is shown a simplified flow chart of the logic sequences of the document feeder rearrangement apparatus. Assuming that the copier has begun its operation, the LCU 31 checks the copier 1 and the feeder 50, respectively, for malfunctions. The machine will proceed with its operation until the copy run is completed if no malfunctions have occurred. Let us assume that the LCU 31 has detected a copier malfunction. The malfunction may be of the kind which will not interfere with the continuity of copying. After this malfunction is corrected, the feeder and copier resume operation. If one of the jam sensors 32, 33, or 34 detects a paper jam, the copier 1 will be "hard shutdown". Even prior to the correction of the jam, the LCU 31 will signal the feeder 50 to feed original documents in a reordering sequence. It must be realized that the computer knows the copy count of copies which have exited from the copier past the switch 34 and the number of copy sheets which have passed by switch 32. Thus, the computer causes the feeder 50 to rearrange the documents until the bottom-most document in the stack corresponds to the next document to be copied. When there is a proper rearrangement configuration, the machine will wait until the paper jam is corrected. After the paper jam is corrected and the start button is depressed, copying will continue until END is reached.

Returning now to the beginning of the logic diagram, assume that there has been a malfunction in the feeder caused by a document jam. The feeder will be shutdown, but the copier will continue operating until all of the copies in process have been completed. The operator removes all documents from the feeder and replace them in their initial order. Here again, the LCU 31 knows which copies have been copied and will set the number of copy sheets which have been fed past switch 32 equal to zero. The LCU 31 then causes the feeder to rearrange the documents until the appropriate document is at the bottom of the stack. Alternatively, the operator could just remove the jammed documents, and place the jammed documents on top of the stack; the LCU 31 would cause the feeder to cycle the documents back to their initial position.

If single-sided copies or the first sides of double-sided copies are to be made, the computer accumulates the total number of copies that pass the exit switch 34 of FIG. 1. If a paper jam occurs in the copier 1, the operator removes all copy sheets in the copy paper feed path (which may for example be as many as six) and throw the removed sheets away. Then, the automatic rearrangement apparatus will recirculate the copies from the bottom of the stack until the total number of copies which have passed the switch 150 equals the total number of copies which have passed the switch 34. At this point, the documents in the feeder have been rearranged.

To copy the second sides of a duplex (double-sided) copy run, the operator places the first-sided copies in one of the bins 23 or 24. Now, copying of the second side of the duplex copy run can begin. The computer counts the number of copies that pass the switch 32; the total number will be used to rearrange the documents if a paper jam occurs.

In a copier jam situation, the operator will remove and dispose of all copies in the feed path. The next image to be exposed must correspond to the already processed first-side image of the copy to be fed. When the copy run is completed, there will, of course, be missing copies from the set. The operator will have to complete these missing copies at a later time.

Figure 7:
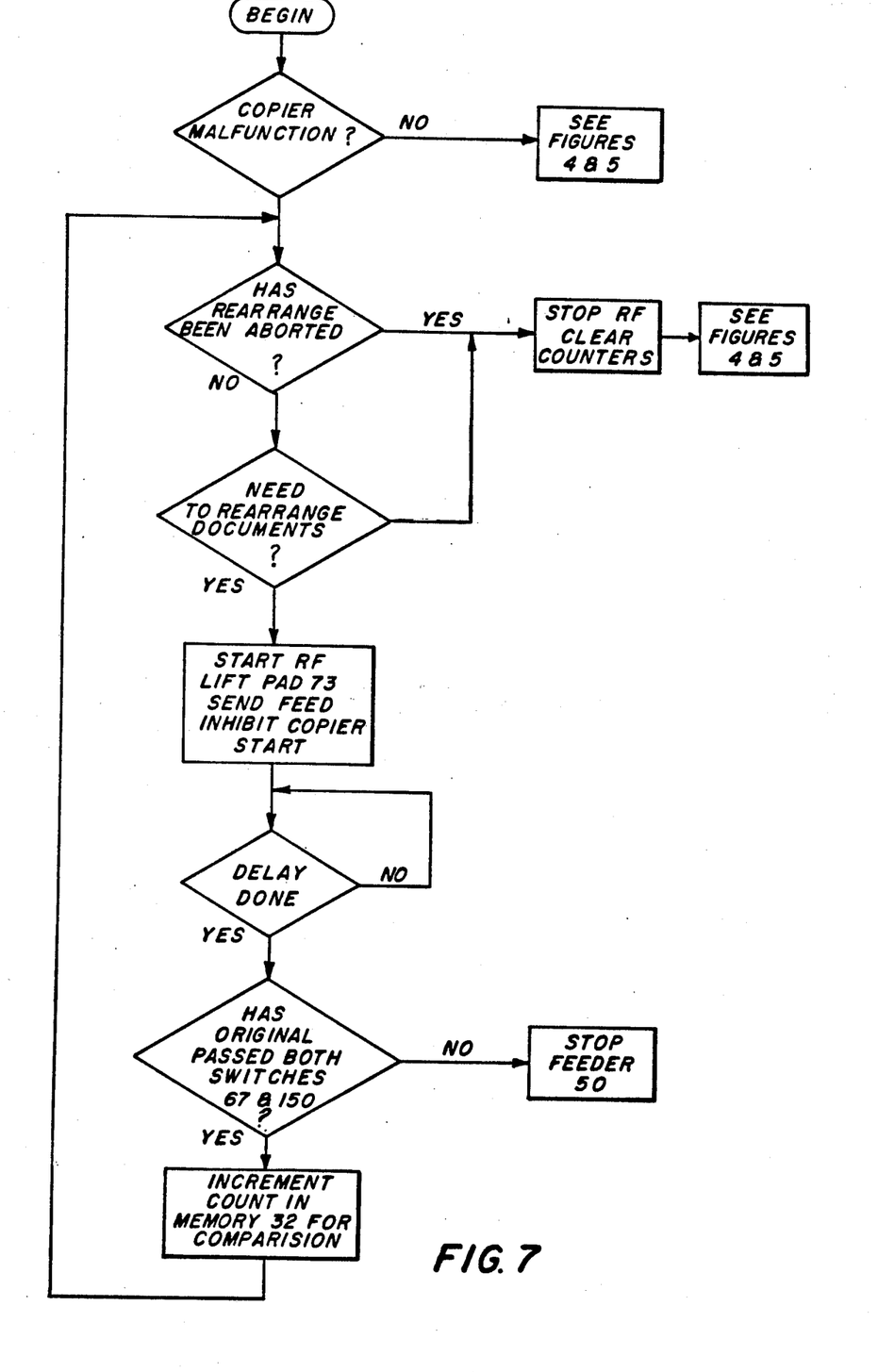
FIGS. 7 and 8 are flow charts, in more detail, of portions of the sequencing operations illustrated in FIG. 4 when malfunctions have occurred in the feeder or the copier.

Turning now to FIG. 7, there is shown the flow chart for the rearrangement of documents in the feeder when a malfunction occurs in the copier 1. The first decision that is made is whether there has been a copier malfunction. The operation proceeds as in FIGS. 4 and 5 if there has not been a malfunction. If there has been a malfunction, the LCU 31 checks to see whether the operator has depressed a cancel switch. If, for any reason, the operator has decided to abort or cancel the run, the LCU 31 will stop the recirculating feeder and clear all counters. Now, when the operator enters new information concerning a run, the machine will function in accordance with the flow charts of FIGS. 4 and 5. If the run has not been aborted, the LCU 31 will determine whether the documents need to be rearranged. If rearrangement is unnecessary, the operation of the feeder will proceed as in the flow charts of FIGS. 4 and 5. If rearrangement is necessary, the LCU 31 energizes the motor 93, clutch 115, and the blower motor, causes the pads 73 to be lifted, and causes a document to be recirculated. After an appropriate delay, the computer determines if this document has passed switches 67 and 150. If the document has not passed switches 67 and 150, the feeder is stopped and a feeder jam is indicated. If the document has sucessfully passed the switch 150, the switch 150 provides an incremental count signal to the computer. The incremental count signal in a single-sided run or the first pass of a duplex run is compared with the cumulative count of signals from switches 34 or 32, respectively. When the switch 150 signal counts are equal to the cumulative total counts from switches 34 or 32, and when the computer program logic returns to the decision block of whether or not documents need to be reordered, the logic will branch to the flow charts of FIGS. 4 or 5. If these counts are not equal, the flow chart will proceed as discussed above until these counts become equal.

Figure 8:
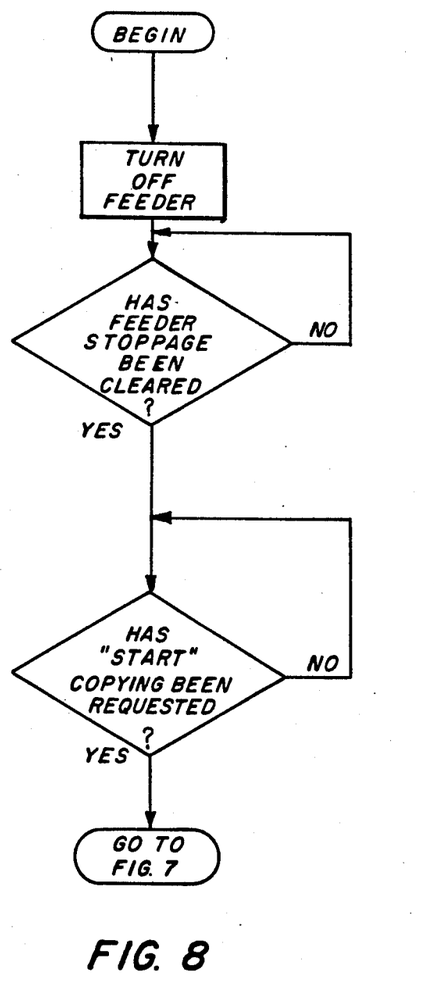

FIG. 8 shows a flow chart for the mode of operation when there has been a malfunction in the feeder. "Begin" indicates a malfunction. The LCU 31 then turns off the feeder. The next step requires an operator to clear the malfunction, such as a paper jam, and replace the document in their initial order in the feeder. Finally, the operator depresses the "start" button. The logic branches to "Begin" in FIG. 7, and the operation continues as in FIG. 7.

Figure 9:
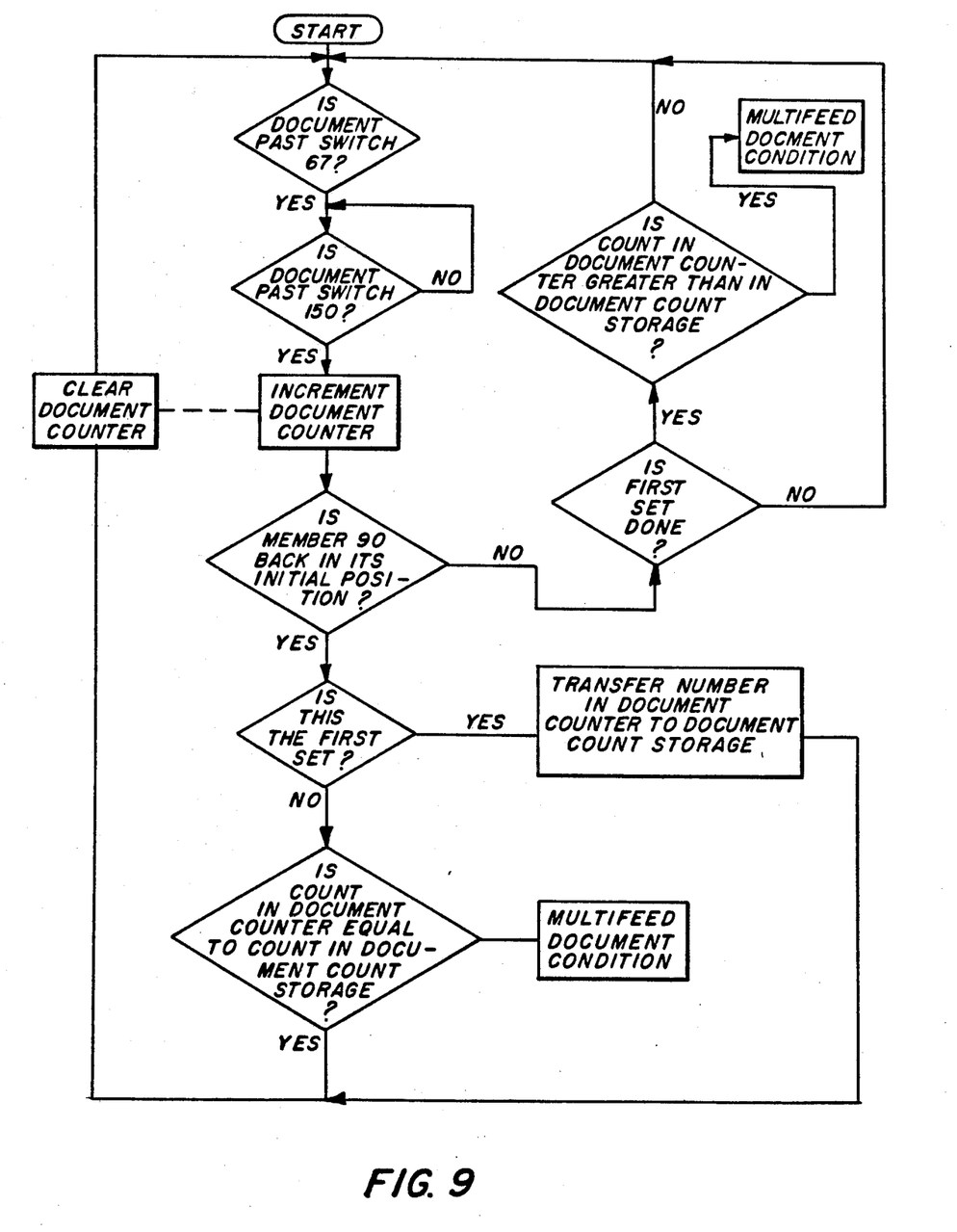
FIG. 9 shows the flow chart for the LCU of FIG. 3 to determine if there has been multiple document feed condition.

FIG. 9 shows the flow chart for determining a multiple document feed condition. Before discussing FIG. 9 in detail, its general function will be set forth. On the first run of the feeder, the number of documents which have successfully passed the switch 150 are counted in a document counter found in a specified location of memory 32. When the first set of copies is completed, this number is transferred to another memory location which, for convenience, is called document count storage. On the following runs, the total cumulative number of documents in each set of copies is compared with the number of documents which have passed switch 150. If these counts are not equal, a multi-feed document condition is indicated and the feeder is stopped.

Turning in detail to FIG. 9, the first two decisions made by the computer as in FIGS. 4 and 5 are, has the document successfully passed switches 67 and 150? If the document has passed both switches 67 and 150, the document counter is incremented by one. The next question is, is separator member 90 in its initial position? If the separator member 90 is in its initial position, and if the set of copies is the first set to be copied (i.e. there is a number in the set counter, see FIG. 5), the number held in the document counter is transferred to the document count storage.

If the LCU 31 determines that the set of copies is completed and is the first set of copies, the logic branches back to the "Start" position. If the set of copies is not the first set, the next question asked is, is the number in the document counter greater than the number in the document count storage? If the number in the document counter is greater than the number in the document count storage, the feeder is stopped and a multi-feed condition in one of the preceding sets is indicated. If the number in the document counter is not greater than the number in the document count storage, the logic branches back to "Start".

Viewing the lower portion of the logic, let us assume that it has been determined that the set of copies is not the first set. Then, the count in the document counter is compared with the count in the document count storage; if these counts are equal, the document counter is cleared and the logic branches back to "Start". If these counts are not equal, a multi-feed document condition has occurred and the feeder is shutdown.

Figure 10:
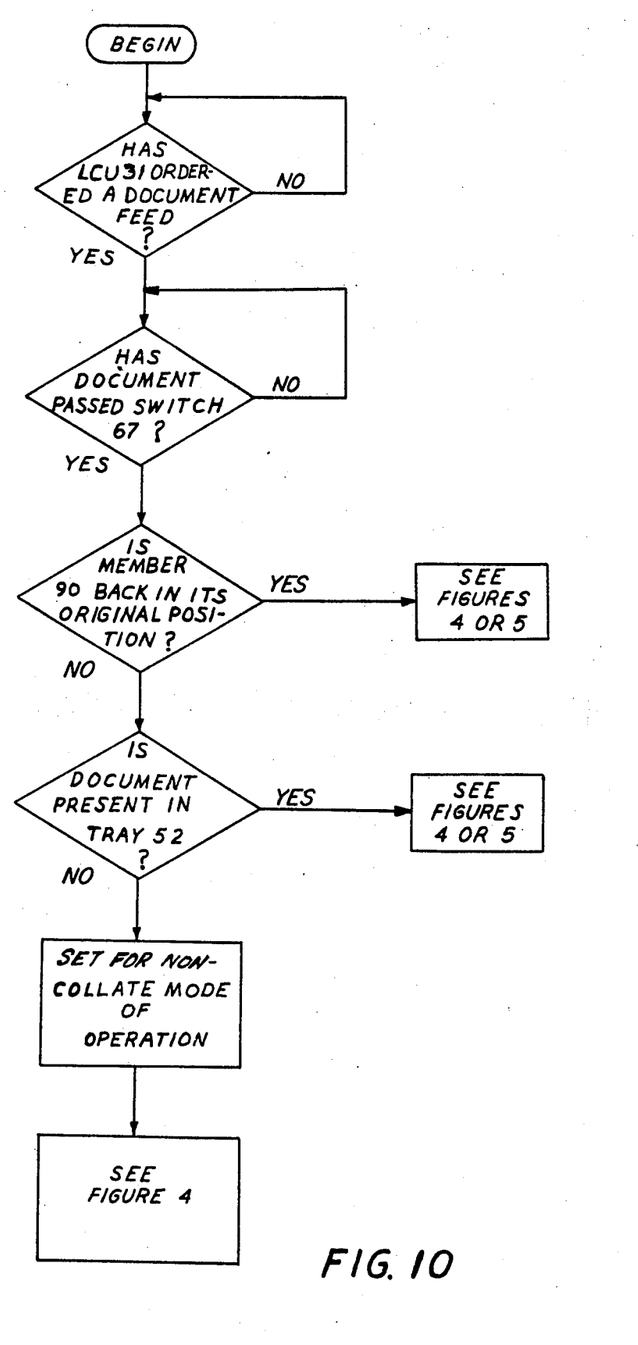
FIG. 10 shows a flow chart of apparatus which automatically transfers the mode of feeder operation from collate (see FIG. 5) to noncollate (see FIG. 4).

Turning now to FIG. 10, there is shown a flow chart for apparatus which transfers the operation of the feeder and copier 1 from the collate to the noncollate mode when only a single original document is to be copied. This situation may be encountered as follows: If an operator mistakenly depresses the collate mode button, or if the machine was in the collate mode and the operator forgot to change the feeder to the noncollate mode, and if a single original document is placed in the feeder 50, the LCU 31 will automatically transfer the feeder operation from the collate to the noncollate mode.

More specifically, the first question asked by the computer is, has the LCU 31 ordered a document to be fed? Next, the switch 67 is sampled (as described above) to determine if the document has passed thereby. The next question asked by the computer is, is the separator member 90 in its initial position? If the separator member 90 is in its initial position, then one or more document sheets are in the tray, and the operation will proceed in the noncollate or collate mode as in FIGS. 4 or 5, respectively. If the separator member 90 is not in its initial position (i.e. has dropped through opening 92, see FIG. 2), the photocell 132 is sampled; and, if the photocell 132 is in the logic "1" state (no document is present), the LCU 31 will transfer the mode of operation from collate to noncollate. If the feeder and copier were in the noncollate mode of operation, the feeder would remain in such mode and proceed as in FIG. 4. If a document were detected in the tray 52, then, the feeder would proceed the selected mode, noncollate or collate.

The invention has been described in detail with particular reference to a preferred embodiment thereof, but it will be understood that variations and modifications can be effected within the spirit and scope of the invention.

We claim:

1. In a recirculating feeder for use with a copier wherein the feeder sequentially transports individual documents from document receiving means to an exposure platen of the copier where they are exposed and copied by the copier and then returned back to the document receiving means, the feeder being selectively operable in a collate mode wherein after a document is transported to the platen it is copied once before it is returned to the document receiving means, and a noncollate mode wherein after a document is transported to the platen it is copied a plurality of times before it is returned to the document receiving means, the improvement comprising:

(a) means for detecting when only a single document is in the feeder; and (b) means responsive to said detecting means for changing feeder operation from the collate mode to the noncollate mode when only a single document is detected in the feeder, whereby such single document is copied a plurality of times at the platen before being removed from the platen.

2. In a recirculating document feeder for use with a copier, wherein the feeder sequentially transports individual documents from document receiving means to an exposure platen of the copier where they are exposed and copied by the copier and then returned back to the document receiving means, the feeder being selectively operable in a collate mode wherein after a document is transported to the platen it is copied once before it is returned to the document receiving means, and a noncollate mode wherein after a document is transported to the platen it is copied a plurality of times before it is returned to the document receiving means, the improvement comprising:

(a) means for determining when a first document has been transported from the document receiving means;

(b) means for detecting an absence of all documents in the document receiving means at a time before the first document returns to the document receiving means; and (c) means responsive to said detecting means for changing the recirculating feeder operation from the collate mode to the noncollate mode when the absence of documents in the document receiving means is detected, whereby such first document is copied a plurality of times at the platen before being from the platen.

3. The invention as set forth in claim 2 wherein said detecting means includes a source of illumination and a photocell spaced from said source.

* * * * *